C. B. SMITH.
Coffee-Pot.
No. 161,640. Patented April 6, 1875.
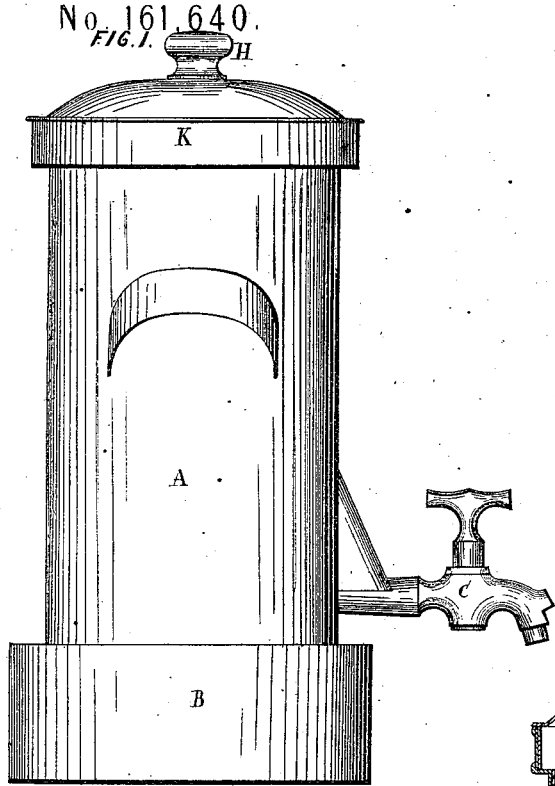
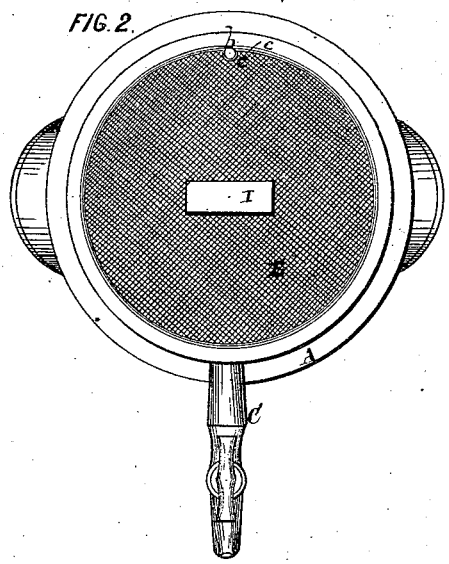
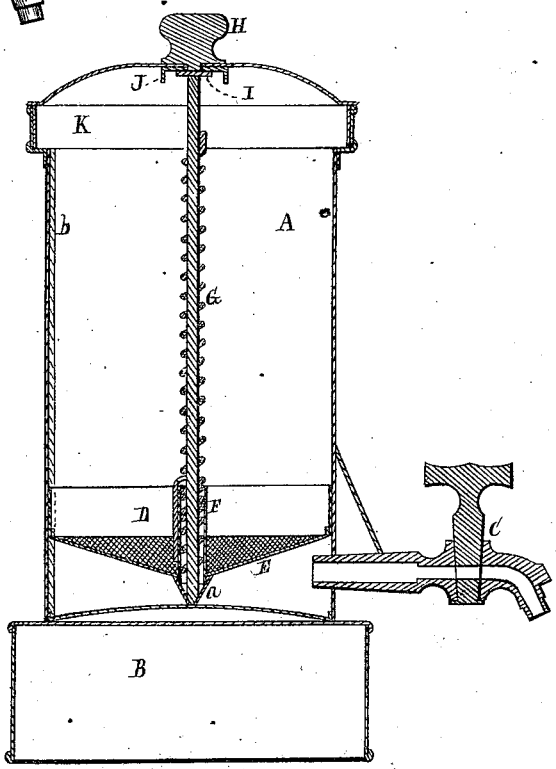
WITNESSES.
INVENTOR.

UNITED STATES PATENT OFFICE.

CHARLES B. SMITH, OF CLEVELAND, OHIO.

IMPROVEMENT IN COFFEE-POTS.

Specification forming part of Letters Patent No. 161,640, dated April 6, 1875; application filed March 13, 1875.

*To all whom it may concern:*

Be it known that I, CHARLES B. SMITH, of Cleveland, in the county of Cuyahoga and State of Ohio, have invented a certain new and Improved Apparatus for making Coffee, of which the following is a full and complete description, reference being had to the accompanying drawings making part of the same.

Figure 1 is a side view of the coffee-pot. Fig. 2 is an inside view. Fig. 3 is a detached section. Fig. 4 is a vertical transverse section.

Like letters of reference refer to like parts in the several views.

This invention relates to a coffee-pot; and the purpose of this invention is to prepare coffee without placing the coffee loosely in the water to be digested and the decoction allowed to stand upon the coffee-grounds when prepared. To this end the coffee is placed in a dish having a perforated bottom and introduced into the pot and removed therefrom at the proper time by means of a screw operated from the top of the coffee-pot, substantially as hereinafter more fully described.

In the drawing A represents the body of the coffee-pot; B, a base to elevate it so that a cup may be placed under the faucet C. To the inside of the pot is closely, but not tightly, fitted a dish, D, provided with a perforated bottom, E. In the center of the dish is a nut, F, Fig. 4, wherein is fitted a screw, G. A detached view of the dish and screw is shown in Fig. 3. In the bottom of the coffee-pot is a step, $a$, Fig. 4, wherein rests the end of the screw, and whereon it revolves for raising and lowering the dish in the pot, the screw being operated from the outside by means of a knob, H, on the cover of the coffee-pot. Said knob is free to turn, and is put in connection with the arm I of the screw by a clamp, J, Fig. 4, secured to the stem of the knob on the inside of the cover, which, when the cover is put on, embraces the arms of the screw, as shown in said Fig. 4.

The practical operation of the above-described coffee-pot is as follows: A drawing of coffee is placed in the dish, which is screwed to the upper end of the screw for that purpose. The screw and dish are now introduced into the pot. The foot of the screw has its bearings in the step $a$. On turning the screw in the proper direction, by means of the arm I, the dish will be carried down into the pot, as shown in Fig. 4. Boiling water is now poured in upon the coffee, and the cover K then put on, so that the clamp J will embrace the arms I of the screw. The coffee, after steeping a proper length of time, is then withdrawn from the decoction by turning the screw in the proper direction by means of the knob H referred to, thereby lifting the dish and the coffee-grounds therein out of and above the fluid, without removing the cover, which, if removed, would allow the aroma of the coffee to escape. The prepared coffee or beverage is drawn from the pot through the faucet C. To prevent the dish from turning around in the pot, while being raised or lowered therein, is the purpose of the piece of wire $b$, fastened to one side of the inside of the pot, and extending from top to bottom. A dent or groove, $c$, Fig. 2, is made in the rim of the dish for the admission of the wire. By this device the dish cannot turn around in the pot while it is being screwed upward or downward.

The screw G consists of a piece of wire coiled around the axial stem or rod, and the nut, also, consists of a piece of coiled wire secured in a cylindrical case, as will be seen in the drawings.

Coffee prepared by means of the above-described device will be clear and of finer flavor than when made in the ordinary way, as the coffee is not boiled but simply subjected to the action of boiling water, and, the decoction not being permitted to stand upon the grounds, the caffeic acid it contains is not largely extracted; hence the coffee can be freely drank without producing dizziness and headache—the result of drinking a decoction of coffee made by long boiling or steeping, which extracts the caffeic acid.

What I claim as my invention, and desire to secure by Letters Patent, is—

The knob H, clamp J, and cover K, in combination with the screw G, dish D, and body A, substantially in the manner as described, and for the purpose set forth.

CHARLES B. SMITH.

Witnesses:
J. H. BURRIDGE,
GEO. S. SMITH.